July 4, 1939.  R. D. EVANS  2,165,039
SYSTEM FOR CONTROLLING VOLTAGE OF RECTIFIERS
Filed Jan. 28, 1938  2 Sheets-Sheet 2
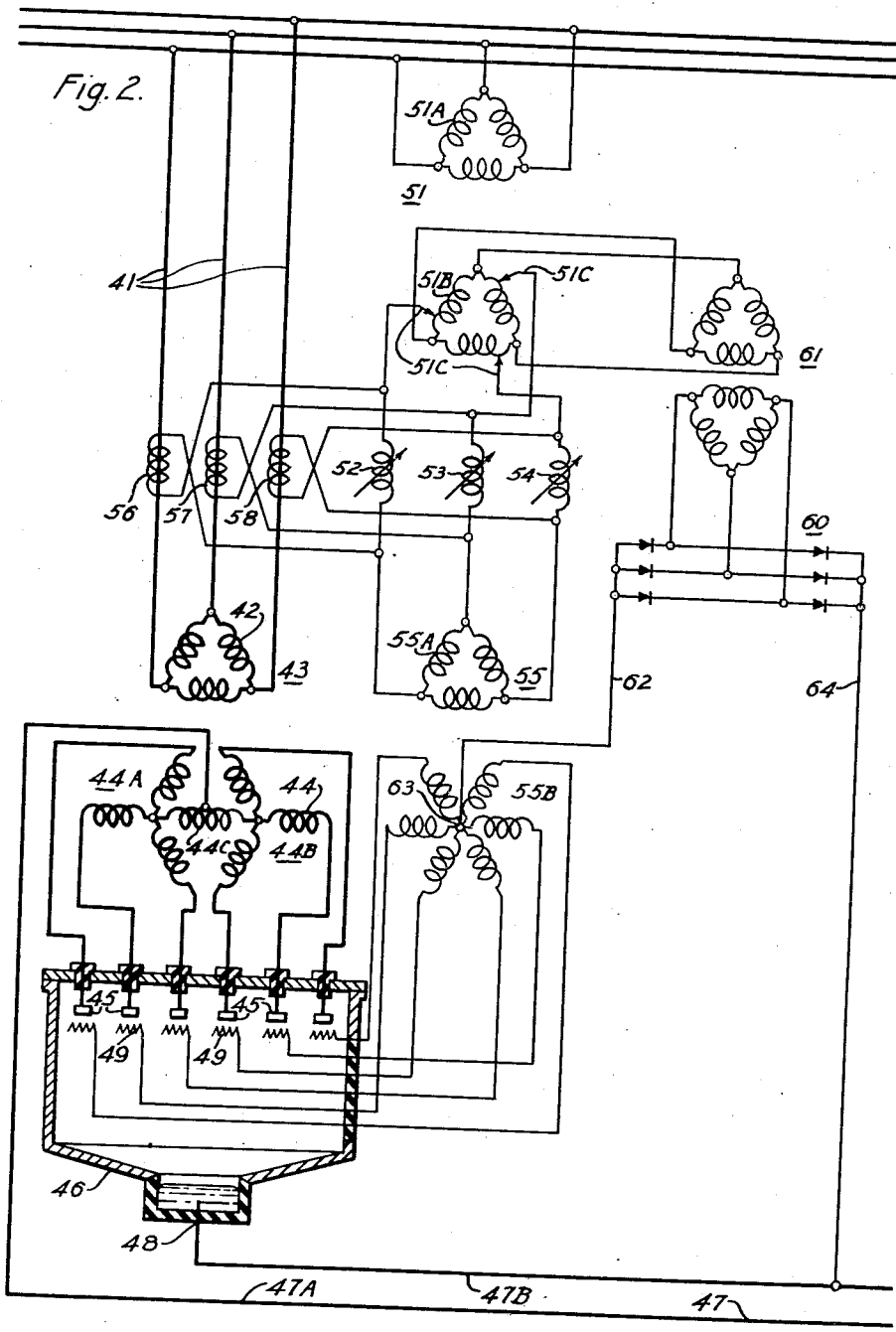
WITNESSES:
INVENTOR
Robert D. Evans.
BY
ATTORNEY Patented July 4, 1939

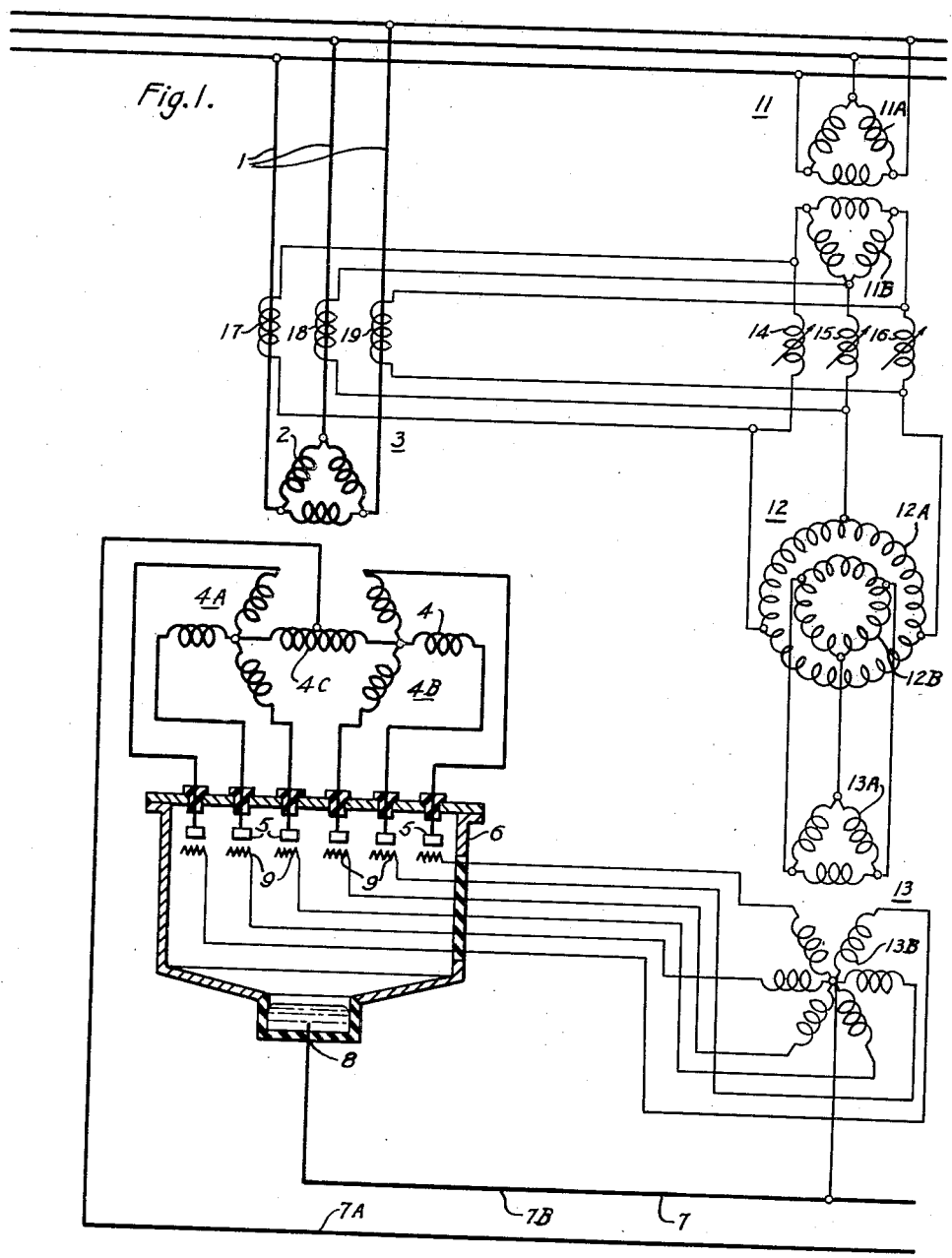

2,165,039

UNITED STATES PATENT OFFICE 2,165,039

SYSTEM FOR CONTROLLING VOLTAGE OF RECTIFIERS

Robert D. Evans, Swissvale, Pa., assignor to Westinghouse Electric & Manufacturing Company, East Pittsburgh, Pa., a corporation of Pennsylvania Application January 28, 1938, Serial No. 187,477

3 Claims. (Cl. 175—363)

This invention relates to power systems and particularly to systems in which alternating current is rectified to direct current and subsequently changed to alternating current.

The object of this invention is to provide a system for controlling the voltage of grids associated with mercury arc rectifier devices in order to control the voltages of the rectifiers themselves to establish a desired type of voltage regulation in the rectifiers.

Another object of the invention is to provide a system of grid control that shall be automatically responsive to load conditions and that shall operate automatically to maintain a desired type of voltage regulation in the rectifier devices.

Theoretically, the voltage regulation curves of rectifiers equipped with grids are parallel straight line curves with the voltage drooping with increased load. Actually, however, the regulation curves depart from such simple theoretical curves for two reasons. First, the voltage difference between the anode and cathode necessary to initiate an arc will vary as a function of the current and other conditions within the rectifier. Second, the grid control voltages will shift under load conditions due to the fact that the voltage applied to the grid is not taken from an infinite source which supplies the rectifier devices, but instead is usually taken from a finite source through a transformer so that the regulation is therefore a function of the circuit impedance. Of these two factors, the first usually has the greater effect upon the voltage regulation curve.

In a rectifier device of the vacuum mercury type, the grid which is employed as a control element to control the operation of the rectifier is energized to effect its control function either by varying the magnitude or the relative phase angle of an alternating current voltage applied to the grid, or the grid is controlled by a biasing direct current voltage, either of which will control the time when the rectifier device may become operative.

The control of the grid element is usually accomplished by mechanical means which embody a certain time element in operation, and therefore introduce some delay in the responsiveness of the rectifier operation to the initiating control impulse.

One of the objects of this invention is to provide a system in which the voltage applied to the grids may be shifted electrically and inherently to a proper phase position as a function of the load current, instead of through mechanical means. The responsiveness of the grid controlling action is thus made inherently, and obviates the usual time delay where automatic relay devices are employed to operate the present type mechanical phase shifters that control the grid potential.

This invention also includes as one of its objects a similar arrangement for automatically controlling the grid bias voltage as a function of the load.

A further object of the invention is, therefore, to provide an automatic system of compensation in the rectifier operation by automatically controlling the grid excitation in accordance with the load on the rectifier.

Two modifications for controlling the grid excitation of a rectifier device, in accordance with the principles of this invention, are illustrated in the accompanying drawings, in which:

Figure 1 is a diagram of a transformer and rectifier device assembly in which the excitation of the grids of the rectifier is controlled automatically through a phase shifter by compensating devices, in accordance with a function of the load on the rectifiers, and Fig. 2 is a diagram of a similar system in which the excitation of the grids is controlled with a biasing voltage and modified in accordance with the load upon the rectifier.

The system shown in the diagram in Fig. 1 comprises generally a polyphase supply circuit 1 connected to the primary windings 2 of a main power transformer 3 whose secondary windings 4 are connected to the anodes 5 of a rectifier 6 that is to convert the energy from the main circuit 1 into direct current for a load circuit 7.

The secondary windings of the main transformer 3 are provided as two star groups 4A and 4B, and their neutral points are connected by a balancing reactor 4C, the midpoint of which serves as a terminal connection for one conductor 7A of the load circuit 7. The other conductor 7B is connected to the cathode 8 of the rectifier device 6.

As is illustrated, the rectifier 6 is provided with six anodes 5. A control grid 9 is associated with each anode 5 to control the time when the associated anode shall be rendered conductive to transmit current between the anode 5 and the cathode 8 in the rectifier. Energy for the grids 9 is derived from the main supply circuit 1 through an auxiliary transformer 11, and is then transmitted through a phase shifter 12 to a grid transformer 13 from which the energy is then supplied to the grids of the rectifier.

The auxiliary transformer 11 is shown with its primary windings 11A connected to the main supply circuit 1. The secondary windings 11B of the transformer are connected to the primary windings 12A of the phase shifter 12 through three impedance devices 14, 15 and 16. The secondary windings 12B of the phase shifter 12 are connected to the primary windings 13A of the grid transformer. The secondary windings 13B of the grid transformer 13 are arranged to provide a 6-phase system of voltages for the grids of the 6-phase anodes of the rectifier 6.

In order to control the grids to compensate for the load upon the rectifier, the voltage to the grids is modified by superimposing upon the impedance devices 14, 15 and 16 additional voltages that vary as a function of the load current to the main transformer and rectifier assembly. Such modifying voltages for the impedance devices 14, 15 and 16 are derived from the main circuit 1 through three current transformers 17, 18 and 19. Each transformer is connected across one of the impedance devices, to introduce a voltage from the current transformer to the circuit including the corresponding impedance device.

As the load upon the rectifier varies, the voltage introduced into the circuits of the primary windings of the phase shifter will be correspondingly varied to provide an automatic regulating and compensating voltage to be transmitted through the phase shifter 12 and through the grid transformer 13 to the grids of the rectifier. By means of such automatic operation, the compensating voltage is applied to the grids instantaneously, and the entire system is rendered inherently responsive to changing load conditions, and serves to maintain a desired predetermined voltage regulation of the rectifier according to the preselected impedance characteristics of the impedance devices 14, 15 and 16.

The arrangement as shown in Fig. 2, is generally similar to that shown in Fig. 1 and is illustrated as embodying the same main elements including a main transformer 43 and a rectifier device 46.

In Fig. 2 a power circuit 41 supplies energy to the primary windings 42 of the main transformer 43 whose secondary windings 44 are connected to the anodes 45 of a rectifier device 46. The rectifier device 46 supplies the rectified direct current to a load circuit 47.

As in the previous figure, the secondary windings of the main transformer are provided in two star groups 44A and 44B, the neutral points of which are connected by a balancing reactor 44C. The midpoint of that reactor is connected to one conductor 47A of the direct current circuit, and the other conductor 47B is connected to the cathode 48 of the rectifier device. Each anode 45 is provided with a control electrode or grid 49 to control the time when the associated anode 45 may become conductive to transmit energy through the rectifier to the cathode 48.

In this modification, energy for the grids 49 is derived from the main supply circuit 41 through an auxiliary transformer 51, having primaries 51A and secondaries 51B, and is then transmitted through three adjustable impedance devices 52, 53 and 54 to a grid transformer whose secondary windings are connected to the respective grids.

The primary winding of the auxiliary transformer is connected to the main supply circuit 41. The secondary windings of the auxiliary transformer are provided with phase shifting taps 51C which are connected to the impedance devices 52, 53 and 54. The impedance devices are connected in the circuit between the secondary windings 51B of the auxiliary transformer and the primary windings 55A of the grid transformer 55. The secondary windings 55B of the grid transformers are arranged to provide a six phase voltage connection for the grids of the rectifier, and the midpoints of the secondary transformer windings 55B are connected together to provide a neutral point, by means of which a biasing voltage may be introduced into the circuits to the grids.

In order to modify the voltage upon the grids in accordance with the load conditions, three current transformers 56, 57 and 58 are connected in the main supply circuit to the main transformer 43, and each of the current transformers is connected across one of the respective impedance devices 52, 53 and 54.

A biasing voltage for the grids is introduced into the grid circuit through an auxiliary rectifier device 60 which is energized from the auxiliary transformer 51 through a small rectifier transformer 61. The rectifier device is illustrated as consisting of a group of rectifier elements of the metallic oxide type, such as a copper oxide, although, of course, any type of rectifier device may be utilized. The three phase voltage derived from the auxiliary rectifier transformer 61 is rectified by the rectifier device 60, and the voltage so derived is supplied to the grid circuit through a conductor connection 62 to the neutral point 63 of the secondary windings of the grid transformer, and the other conductor 64 from the rectifier device is connected to conductor 47B of the load circuit.

In this modification, shown in Fig. 2, I have illustrated the phase-shifting taps on the secondary windings of the auxiliary transformer 51 to provide the phase shift in the grid voltages. Instead of such arrangement, it will be clear, of course, that a phase shifter of the type shown in Fig. 1 may be utilized instead.

By modifying the voltage impressed upon the grid transformer in accordance with the load variation, the voltage regulation of the rectifier will be modified to compensate for the load in such manner as to make the voltage curve of the rectifier approximately flat. By using the grid transformer and the rectox bias, it is possible to obtain voltages impressed on the grid which are of very peaked wave shape. This will have the effect of minimizing the deviation in time of breakdown as a function of rectifier characteristics and load current.

The advantages of the compensation system described reside in the fact that curves which are substantially linear in character may be obtained, and parallel curves obtained for different settings of the phase shifter. The other principal advantage is that flat voltage regulation curves or other similar curves can be obtained by inherent action without requiring the time necessary to operate a mechanical phase shifter. This characteristic is of advantage for rapidly varying load where the time required for a phase shifter would interfere with obtaining the advantage which would otherwise result from the use of phase shifting relays in controlling grid potentials.

My invention is not limited to the specific arrangements illustrated, since they may be modified without departing from the spirit and scope of the invention as set forth in the appended claims.

I claim as my invention:

1. In an electric power system, the combination with an alternating-current power circuit, a direct-current load circuit, a transformer connected to the alternating-current circuit, and a rectifier connected between the transformer and the load circuit and provided with control grids, of means including a transformer energized from the alternating-current circuit to establish and to impress a potential upon the grids, phase-shifting means between said transformer and the grids to control the potential applied to the grids, of means including a transformer energized from the supply circuit to establish a potential for the grids, a grid transformer for impressing said potential upon the grids, impedance devices connected in series in the circuit between the two transformers, and means responsive to the load current supplied to the main power transformer for introducing an additional potential across the impedance devices to modify the potentials for the grids in accordance with and to compensate for the load current.

2. A control system for an electric current conversion system comprising an alternating current circuit, a direct current circuit, a multi-valve vapor-electric converter, connections from each of said circuits to said converter, a control grid for each valve of said converter, a control transformer for impressing control impulses on said grids, connections from said alternating current circuit to said control transformer, phase shifter means interposed in said connections to said control transformer, a reactor connected in each branch of the connection between said phase shifter means and said control transformer, current transformers associated with the connections from said converter to said alternating current circuit and connections for supplying the output potential of said current transformers to said reactors.

3. An electric current conversion system comprising an alternating current circuit, a direct current circuit, transformer means, connections from said transformer means to each of said circuits, a multi-valve vapor-electric converter fed by said transformer means for transferring electric energy between said circuits, a control electrode for each valve of said converter, an impulsing transformer for impressing control impulses on said control electrodes, circuit means for energizing said impulsing transformer from the alternating current circuit, phase shifter means included in said circuit means, series windings included in said circuit means intermediate said phase shifter means and said impulsing transformer, current transformer means associated with the connections from the alternating current circuit to said transformer means and connections for impressing the potential of said current transformer means across said series windings.

ROBERT D. EVANS.